(12) United States Patent
Toh et al.

(10) Patent No.: US 7,732,754 B2
(45) Date of Patent: Jun. 8, 2010

(54) OPTICAL ENCODER WITH AMPLITUDE CORRECTION

(75) Inventors: Kheng Hin Toh, Penang (MY); Gim Eng Chew, Penang (MY); Nanta-Kumar Payandi, Johor (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/112,867

(22) Filed: Apr. 30, 2008

(65) Prior Publication Data
US 2009/0272884 A1  Nov. 5, 2009

(51) Int. Cl.
*G01D 5/34* (2006.01)
(52) U.S. Cl. .............................. 250/231.13; 250/231.16; 356/617
(58) Field of Classification Search ................................
250/231.13–231.18, 237 G, 237 R; 356/616–619; 341/11, 13, 31; 33/1 N, 1 PT
See application file for complete search history.

(56) References Cited

U.S. PATENT DOCUMENTS

| | | | |
|---|---|---|---|
| 4,223,261 A | 9/1980 | White | |
| 4,998,013 A | 3/1991 | Epstein et al. | |
| 5,260,568 A | 11/1993 | Ieki | |
| 5,629,550 A | 5/1997 | Mita et al. | |
| 6,154,278 A | 11/2000 | Ito et al. | |
| 6,229,140 B1 | 5/2001 | Ishizuka | |
| 6,345,074 B1 | 2/2002 | Turk et al. | |
| 6,563,108 B1 | 5/2003 | Stevens et al. | |
| 6,598,196 B1 | 7/2003 | Bussard et al. | |
| 6,885,457 B1 | 4/2005 | Michel et al. | |
| 7,244,928 B2 | 7/2007 | Ng et al. | |
| 7,348,544 B2 | 3/2008 | Atsula et al. | |
| 2004/0172208 A1 | 9/2004 | Freitag et al. | |
| 2007/0138382 A1* | 6/2007 | Matsuyama | 250/231.13 |

OTHER PUBLICATIONS

Quick Assembly Two and Three Channel Optical Encoders—Technical Data HEDM-550x/560x, HEDS-550x/554x, and HEDS-560x/564x, Agilent Technologies. Date unknown.
Specification, ASI IC. Optolab Microsystems. Date unknown.

* cited by examiner

*Primary Examiner*—Thanh X Luu
*Assistant Examiner*—Francis M Legasse, Jr.

(57) ABSTRACT

According to one embodiment, there is provided an optical encoder having a photodetector array comprising motion detection photodetectors and at least one reference photodetector vertically offset from the motion detection photodetectors. The output signal generated by the at least one reference photodetectors is employed to correct undesired variations in the amplitudes of the output signals generated by the motion detection photodetectors. Such variations typically arise from various mechanical and optical misalignments in the optical encoder, and are compensated for by using the reference output signal to add to or subtract from, as required, the amplitudes of motion detection output signals.

21 Claims, 7 Drawing Sheets

OPTICAL ENCODER WITH AMPLITUDE CORRECTION

RELATED APPLICATION

This application incorporates by reference, in its entirety, U.S. patent application Ser. No. 12/112,962 filed Apr. 30, 2008 entitled "Optical Encoder with Code Wheel Misalignment Correction and Automatic Gain Control" to Thor et al.

FIELD OF THE INVENTION

Various embodiments of the invention described herein relate to the field of optical encoders, and components, devices, systems and methods associated therewith.

BACKGROUND

Referring to FIG. 1, there is shown an optical encoder system 10 of the prior art comprising light emitter 20 (typically an LED), code wheel or strip 30 having apertures 31a-31f disposed therein, and light detector 40 comprising photodiodes 41a (A) and 41b (A\). In optical encoder 10, collimated light beam 22 emitted by light emitter 20 projects light onto code wheel 60. Collimated light beam 22 is interrupted by masked or optically non-transparent portions disposed between apertures 31a-31f as code wheel 60 rotates in first direction 110 or in second direction 112. (Note that code wheel 60 rotates substantially in a plane defined approximately by collimated light beam 22 as it is projected from light emitter 20 towards light detector 40.) Portions 50a and 50b of collimated light beam 22 project through apertures 31e and 31d onto light detector 40 and sweep across photodiodes 41b (A\) an 41a (A) as code wheel 60 rotates in direction 110 or 112 in the plane. As code wheel 60 moves in direction 110 or 112, the light patterns projected onto first vertical portion 70 of light detector 40 by beam portions 50a and 50b change, and the output signals provided by photodiodes 41a and 41b change correspondingly. These output signals are generally employed to generate a pair of quasi triangular signals, which are then used to determine any one or more of the position, speed and direction of code disk 60.

In practice, optical encoder 10 of the type illustrated in FIG. 1 suffers from several disadvantages, including undesired variations in the amplitudes of the output signals provided by photodiodes 41a and 41b. For example, the amplitudes of the output signals provided by photodiodes 41a and 41b may not be properly synchronized. Undesired amplitude variations such as these may arise due to process variations occurring during the manufacture of optical encoder 10, errors or misalignments in the layouts of the photodiodes 41a and 41b, wobbling of code disk 60, variations in the light output by light emitter 20, mechanical misalignment in or of one or more of light emitter 20, code wheel 60, or light detector 40, and other problems. In an optical encoder 10 of the type shown in FIG. 1, symmetrical amplitudes between output signals provided by photodiodes 41a and 41b are important to permit subsequently performed signal processing techniques to be accomplished accurately.

FIG. 2 shows idealized output signals provided by photodetectors 41a (signal "A") and 41b (signal "A\"), where maximum and minimum amplitudes 105 and 107 of such respective output signals are achieved, and where the respective maxima and minima of such signals occur at precisely the same times. In actual practice, however, such synchronization of the peaks and valleys of output signals A and A\ may be difficult to achieve owing to the factors described above.

Several approaches have been taken in the prior art to solve the foregoing problems. One such approach is described in U.S. Pat. No. 5,463,393, where two amplitude-encoded sinusoidal signals are squared and summed to provide a compensatory signal. Another such approach is described in U.S. Pat. No. 5,134,404, where quadrature signal errors are continuously corrected by generating an error function signal equal to the sum of squares of the normalized values of each of the quadrature signals, minus a reference constant. Most prior art techniques for correcting errors in quadrature signals fall into one of several categories: matching channel gains to minimize gain error; system calibration, and cross-channel coupling to reduce spatial quadrature errors. To date, none of these solutions to correcting undesired amplitude variations in the output signals provided by photodetectors in optical encoders has proved entirely satisfactory. Additionally, some prior art techniques for correcting such amplitude variations require relatively complicated data processing techniques and circuitry, which of course adds to the cost of an optical encoder.

What is needed is an optical encoder where amplitude variations in the outputs provided by the photodetectors or photodiodes thereof may be corrected quickly, accurately and reliably without resorting to complicated data processing techniques and circuitry, and that may be manufactured at low cost.

SUMMARY

In some embodiments, there is provided an optical encoder comprising a light emitter element configured to emit a collimated beam of light, an optical encoder disk having a plurality of apertures disposed therethrough and configured to rotate substantially in a plane and in a first direction, and a light detector comprising at least first and second photodetectors positioned along the first direction on a first vertical portion thereof and at least one reference photodetector positioned on a second vertical portion thereof, the second vertical portion being vertically offset from the first vertical portion, where the light detector faces the light emitter, the optical encoder disk is disposed and configured to rotate between the light emitter and the light detector such that the collimated light beam is directed substantially in the plane and shines through the apertures onto the first and second vertical portions of the light detector as the disk rotates, the first and second photodetectors are configured to generate, in response to the collimated beam being incident thereon, first and second output signals about 90 degrees out of phase respecting one another, and the reference photodetector is configured to generate, in response to the collimated beam being incident thereon, a third output signal about 45 degrees out of phase respecting the first output signal and the second output signal.

In another embodiment there is provided a method of correcting amplitudes of at least first and second output signals provided by an optical encoder comprising providing a light emitter configured to emit a collimated beam of light, providing an optical encoder disk having a plurality of apertures disposed therethrough and configured to rotate substantially in a plane and in a first direction, providing a light detector comprising at least first and second photodetectors positioned along the first direction on a first vertical portion thereof and at least one reference photodetector positioned on a second vertical portion thereof, the second vertical portion being vertically offset from the first vertical portion, positioning the light detector to face the light emitter, disposing the optical encoder disk between the light emitter and the light detector such that the collimated light beam is directed substantially in the plane and shines through the apertures onto the first and second vertical portions of the light detector as the disk rotates, generating with the first and second photodetectors, in response to the collimated beam being incident thereon, first and second output signals about 90 degrees out of phase respecting one another, generating with the reference photodetector, in response to the collimated beam being incident thereon, a third output signal about 45 degrees out of phase respecting the first output signal and the second output signal, correcting, on the basis of the third output signal, at least one of a first amplitude corresponding to the first output signal and a second amplitude corresponding to the second output signal.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

In the various embodiments of the invention, an optical encoder is provided having at least one reference photodetector disposed therein that is vertically offset from and horizontally disposed between first and second motion detector photodetectors.

Figure 1:
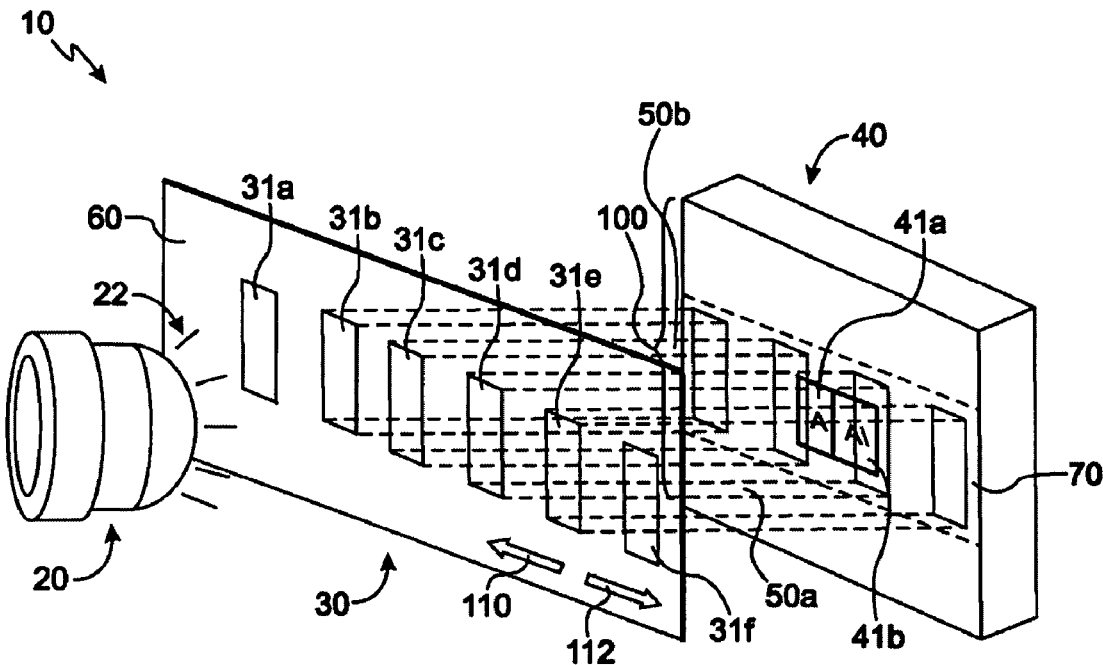
FIG. 1 shows an optical encoder 10 of the prior art.
Figure 2:
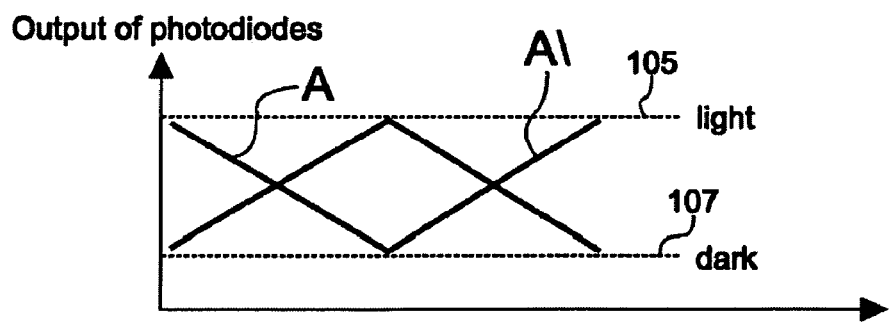
FIG. 2 shows motion detection output signals provided by the optical encoder of FIG. 1.
Figure 3:
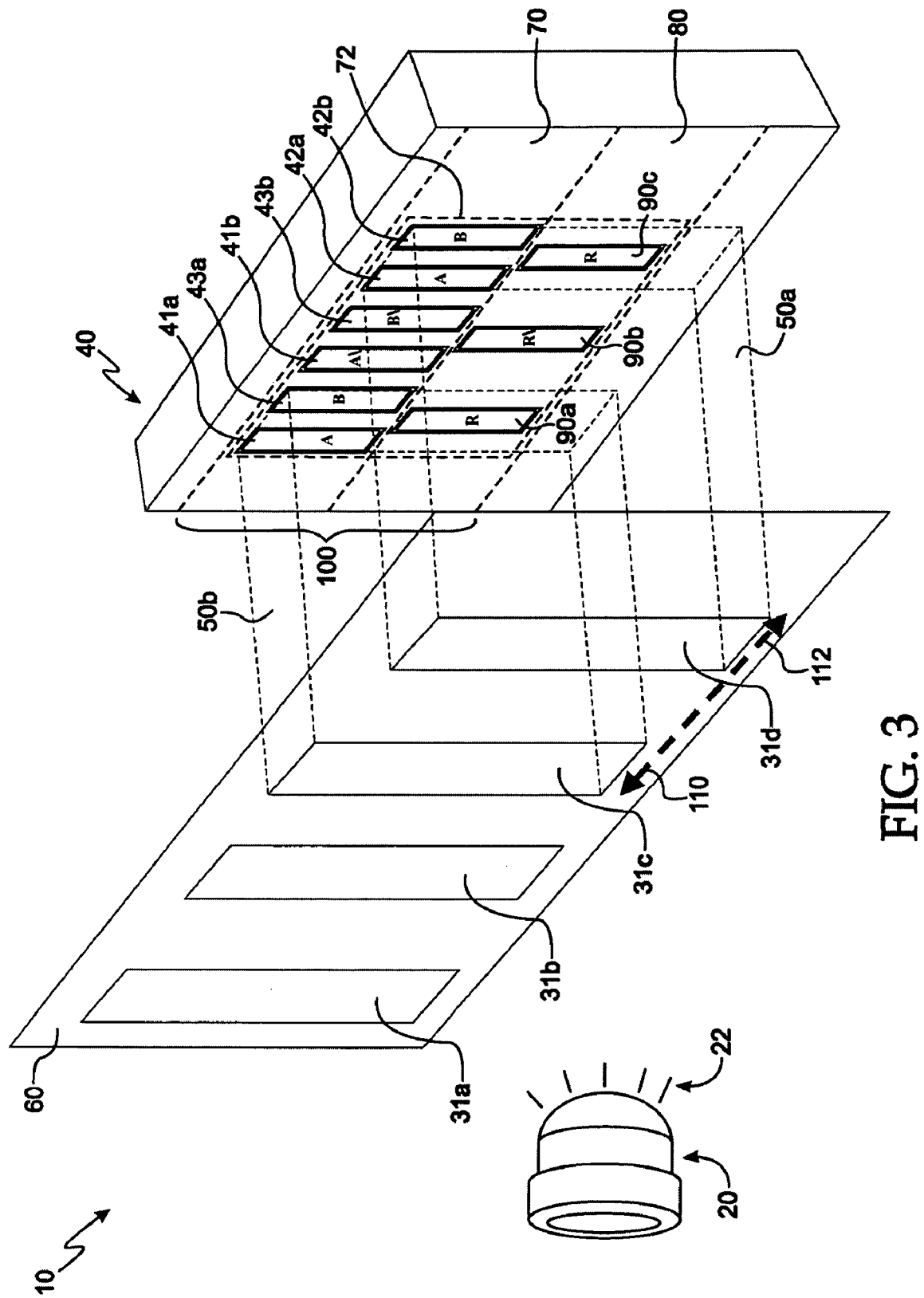
FIG. 3 shows one embodiment of an optical encoder 10 of the invention.

According to one embodiment shown in FIG. 3, there is provided an optical encoder comprising light emitter 20 (typically an LED or other appropriate light source), code wheel or strip 30 having apertures 31a-31d disposed therein, and light detector 40 comprising photodiode or photodetector array 72. Included in photodiode array 72 are at least motion detection photodiodes or photodetectors 41a (A) and 41b (A\) and at least one reference photodiode or photodetector 90a. Other photodiodes or photodetectors may also be included in photodiode array 72, such as photodiodes or photodetectors 43a (B), 43b (B\), 42a (A), 42b (B), 90b (R\) and 90c (R) shown in FIGS. 3 and 6, more about which is said below.

In optical encoder 10, collimated light beam 22 emitted by light emitter 20 projects light onto code wheel 60. Collimated light beam 22 is interrupted by masked or optically non-transparent portions disposed between apertures 31a-31d as code wheel 60 rotates in first direction 110 or in second direction 112. (Note that code wheel 60 rotates substantially in a plane defined approximately by collimated light beam 22 as it is projected from light emitter 20 towards light detector 40.) Portions 50a and 50b of collimated light beam 22 project through apertures 31d and 31c onto light detector 40 and sweep across the various photodiodes contained in photodiode array 72 as code wheel 60 rotates in direction 110 or 112 in the plane. As code wheel 60 moves in direction 110 or 112, the light patterns projected onto first vertical portion 70 of light detector 40 by beam portions 50a and 50b change, and the output signals provided by photodiodes 41a, 43a, 41b, 43b, 42a and 42b change correspondingly.

Note further, however, that light beam portions 50a and 50b also sweep across reference photodiodes 90a (R), 90b (R\) and 90c (R) disposed on second vertical portion 80 of photodetector 40 as code wheel 60 moves in direction 110 or 112. Second vertical portion 80 of photodetector is vertically offset from first vertical portion 70 of photodetector 40. Reference photodiodes 90a (R), 90b (R\) and 90c (R) also generate output signals that change in accordance with the position and speed of code wheel 60, which are employed to correct undesired variations in the amplitudes in one or more of the output signals provided by photodiodes 41a, 43a, 41b, 43b, 42a and 42b.

Continuing to refer to the embodiment illustrated in FIG. 3, it will be seen that reference photodiode 90a (R) is located in a position below and midway between photodiodes 41a (A) and 43a (B). Similarly, reference photodiode 90b (R\) is located in a position below and midway between photodiodes 41b (A\) and 43b (B\), and reference photodiode 90c (R) is located in a position below and midway between photodiodes 42a (A) and 42b (B).

Figure 5:
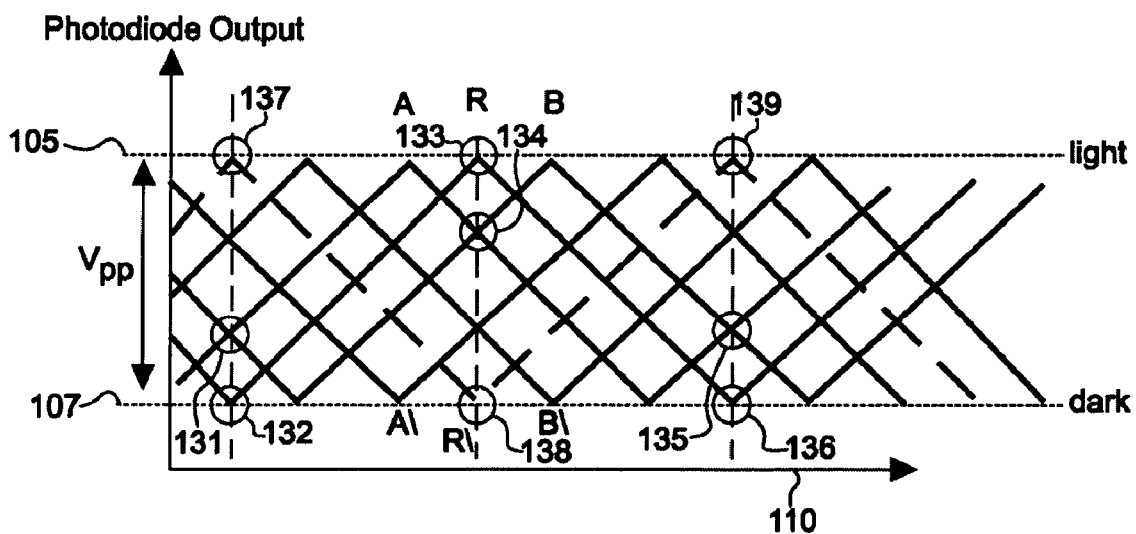
Figure 6:
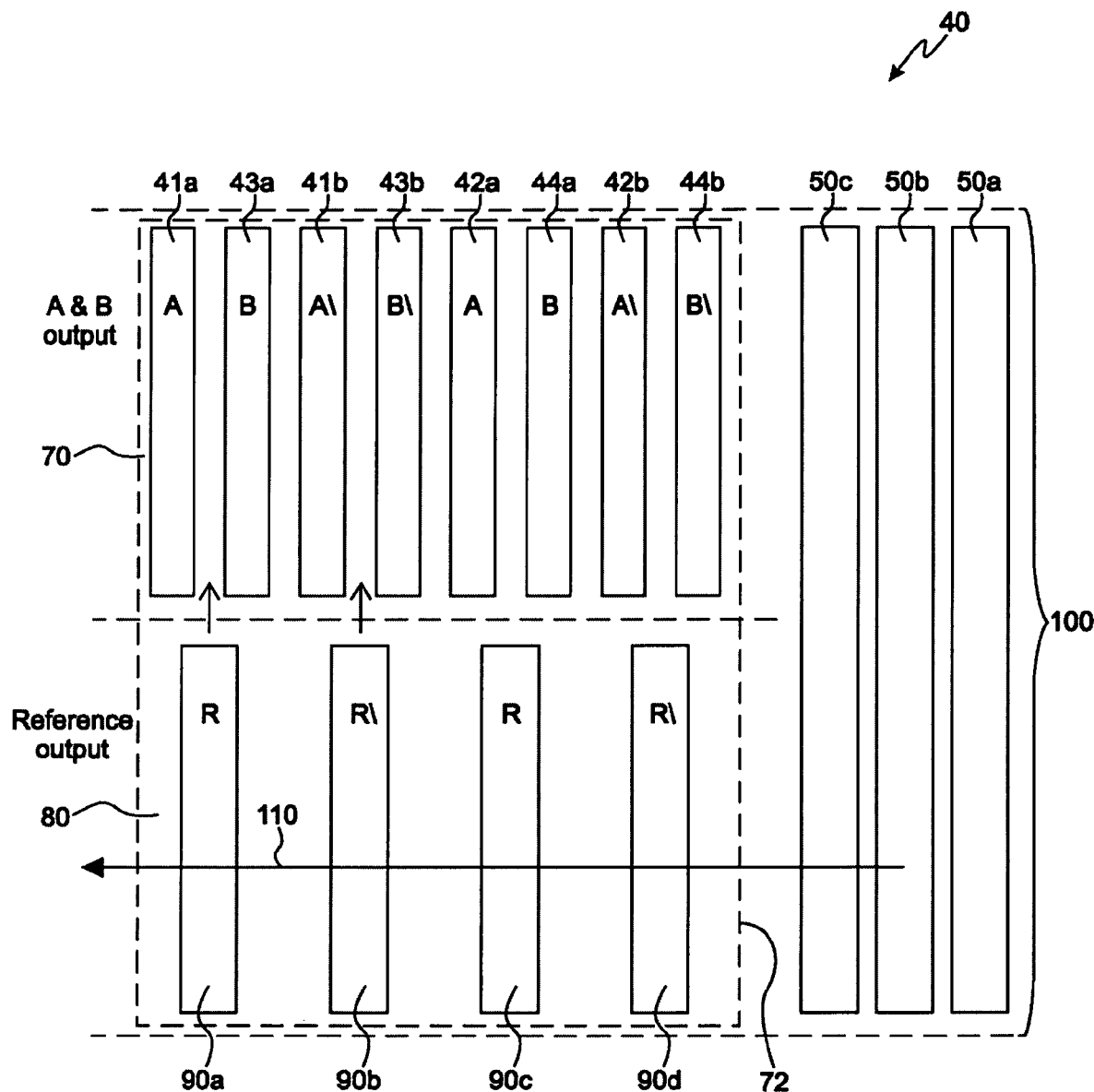
FIG. 6 shows another embodiment of an optical encoder.

Such a configuration of the various photodiodes in photodiode array 72 results in the output signals like those illustrated in FIGS. 5 and 6, where output signals corresponding to photodiodes A, A\, B, B\, R and R\ are shown. As illustrated in FIGS. 5 and 6, output signals R and R\ are about 45 degrees out of phase with respect to output signals A, A\, B and B\ owing to the spatial positioning in photodiode array 72 of photodiodes 90a, 90b and 90c respecting photodiodes 41a, 43a, 41b, 43b, 42a and 42b. Output signals corresponding to photodiodes 90a, 90b and 90c should fall precisely midway between those corresponding to photodiodes 41a, 43a, 41b, 43b, 42a and 42b, assuming that all the various optical and mechanical elements of encoder 10 are aligned properly. More particularly, the peak or maximum amplitude of reference signal R should always be $\tfrac{2}{3} V_{pp}$ of output signals A and B, and the valley or minimum amplitude of reference signal R should always be $\tfrac{1}{3} V_{pp}$ of output signals A and B. The same amplitude relationships also hold true for reference signal R\ respecting output signals A\ and B\.

As noted above, however, misalignments between the various components of encoder 10 are rather typical, and thus some variation from 45 degrees of phase difference between output signals may be expected as code wheel 60 rotates and beam portions 50a and 50b sweep across photodiode array 72.

FIG. 6 illustrates in detail one example of how errors in synchronization between output signals A, A\, B and B\ can be detected and corrected using reference output signals R and R\. In FIG. 6, minimum amplitude 107 of reference signal R at 132 corresponds to $\tfrac{1}{3} V_{pp}$ amplitude A signal at 131 and maximum amplitude 105 of reference signal R\ at 137. Also as shown in FIG. 6, at 133 maximum amplitude 105 of reference signal R is time-synchronized with $\tfrac{2}{3} V_{pp}$ amplitude signal A at 134 and minimum amplitude 107 of reference signal R\ at 138. Finally, and also as shown in FIG. 6, at 139 maximum amplitude 105 of reference signal R\ is time-synchronized with signals R (minimum amplitude 107) and B (amplitude of ⅓ $V_{pp}$) at 136 and 135, respectively.

Figure 4:
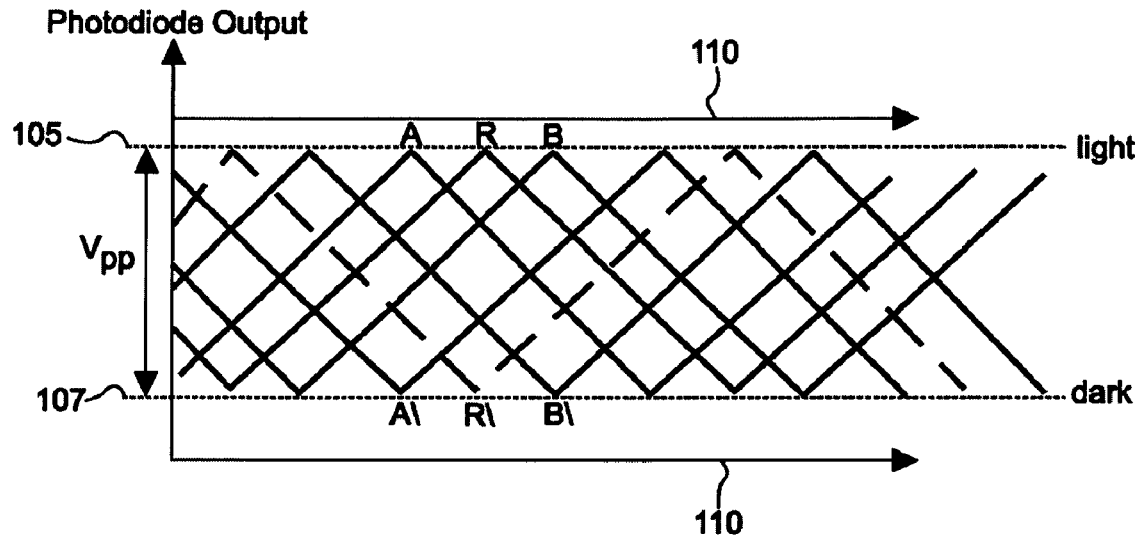
FIGS. 4 and 5 show motion detection and reference output signals provided by the optical encoder 10 of FIG. 4.

The foregoing described time-offsets between motion detection output signals (i.e., signals A, A\, B and B\) and reference output signals (i.e., R and R\) are then employed by circuitry connected to photodiode array 72 to correct the amplitudes corresponding to the detected phase errors occurring between any of output signals A, A\, B, B\. Thus, according to the examples of FIGS. 5 and 6, if signal R at its peak amplitude 105 does not correspond in time to an amplitude of ⅔ $V_{pp}$ in motion detection output signal A or B, if signal R at its minimum amplitude 107 does not correspond to an amplitude of ⅓ $V_{pp}$ in motion detection output signal A or B, if signal R\ at its peak amplitude 105 does not correspond in time to an amplitude of ⅔ $V_{pp}$ in motion detection output signal A\ or B\, or if signal R\ at its minimum amplitude 107 does not correspond to an amplitude of ⅓ $V_{pp}$ in motion detection output signal A\ or B\, a mechanism is triggered to correct the amplitude distortions resulting from the detected misalignment of encoder 10 such that appropriate amounts are added to or subtracted from the amplitudes of motion detection output signals A, A\, B and/or B\ as required. Note further that in the embodiment illustrated in FIGS. 3 through 5, a comparison point is generated for every peak and valley corresponding to motion detection output signals A, A\, B and B\. As a result, undesired amplitude variations are detected quickly and corrected quickly.

Note that according to one embodiment only one reference photodiode 90a, 90b or 90c is required to provide such correction. Note further that only one pair of motion detection photodiodes 41a and 41b is required in optical encoder 10 of the invention. The use of additional, reference and motion detection photodetectors or photodiodes in photodiode array 70 adds to the accuracy and efficacy of optical encoder 10 of the invention however. Note further that the one or more reference photodiodes need not be positioned spatially with respect to corresponding motion detection photodiodes such that approximately 45 degree phase shifts are produced in the output signals corresponding respectively thereto. While an approximate 45 degree phase shift between an output signal provided by a reference photodiodes and the output signals provided by a pair of motion detection photodiode is desirable because the reference photodiode need only be positioned midway between the horizontal distance spanning the two paired motion detection photodiodes, other phase shifts corresponding to other horizontal spacings are also contemplated. For example, phase shifts and corresponding horizontal spacings of 60 degrees and 30 degrees, 30 degrees and 60 degrees, 70 degrees and 20 degrees, 20 degrees and 70 degrees, and other phase shifts are contemplated.

Referring now to FIG. 6, there is shown another embodiment where photodiode array 72 comprises eight motion detection photodiodes 41a, 43a, 41b, 43b, 42a, 44a, 42b, 44b positioned sequentially and equally spaced apart from one another along direction of motion 110 on first vertical portion 70, four reference electrodes 90a, 90b, 90c and 90d positioned sequentially and spaced equally apart from one another along direction of motion 110 in second vertical portion 80. As shown beam portions 50c, 50b and 50a created by light emitted from light emitter 10 and projected through apertures 31 (not shown in FIG. 6) sweep across photodiode array 72 and generate output signals similar to those shown in FIGS. 4 and 5. As in the embodiment illustrated in FIG. 3, the output signals corresponding to reference photodiodes 90a through 90d are employed to correct undesired amplitude variations or deviations occurring in motion detection photodiodes 41a through 44b. In the embodiment of optical encoder 10 illustrated in FIG. 6, more accurate motion detection and amplitude correction is permitted respecting the embodiment shown in FIG. 3 due to the use of an increased number of motion detection and reference photodiodes. As in the embodiment shown in FIG. 3, each of the reference photodiodes is spaced midway horizontally between the pair of motion detection photodiodes corresponding thereto, thereby leading to 45 degree phase shifts between motion detection and reference photodiode output signals. It is to be noted, however, that the invention includes within its scope other horizontal spacings and phase shifts.

Figure 7:
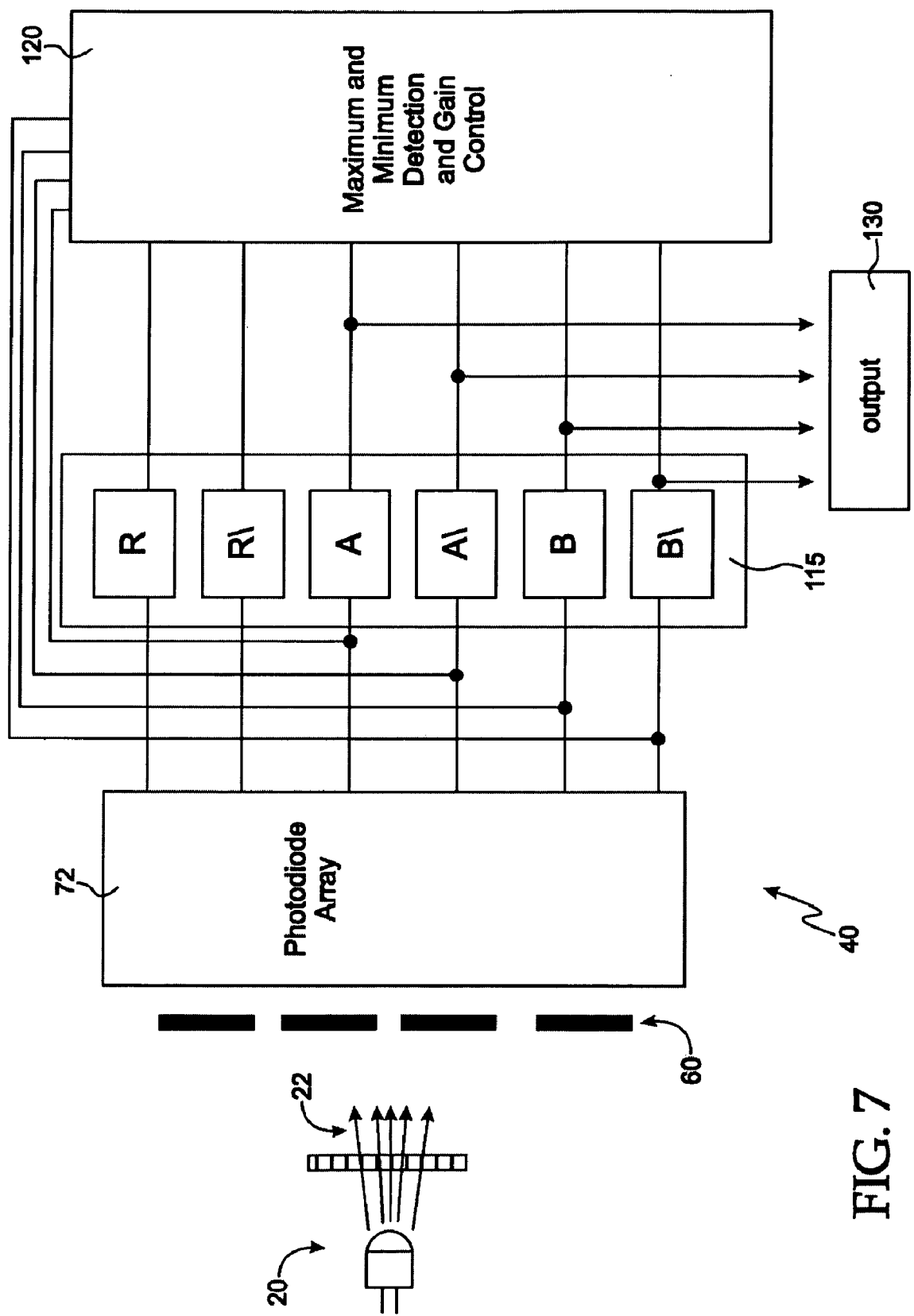
FIG. 7 shows a block diagram according to one embodiment of optical encoder 10.

FIG. 7 illustrates one embodiment of a block diagram of light detector 40 and circuitry associated therewith. As shown light emitter 20 emits a collimated beam of light 22 in the direction of encoder wheel 60 having apertures disposed therein. In a preferred embodiment, such apertures are regularly spaced from one another along the periphery of encoder wheel 60. Light passing through encoder wheel 60 impinges and is incident on photodiode array 72, which in one embodiment generates output signals R, R\, A, A\, B and B\ corresponding to photodiodes 90a, 90b, 41a, 41b, 43a and 43b, respectively. These output signals are routed to amplifier circuitry 115 and amplitude detection and gain control circuitry 120, and thence to output 130.

Figure 8:
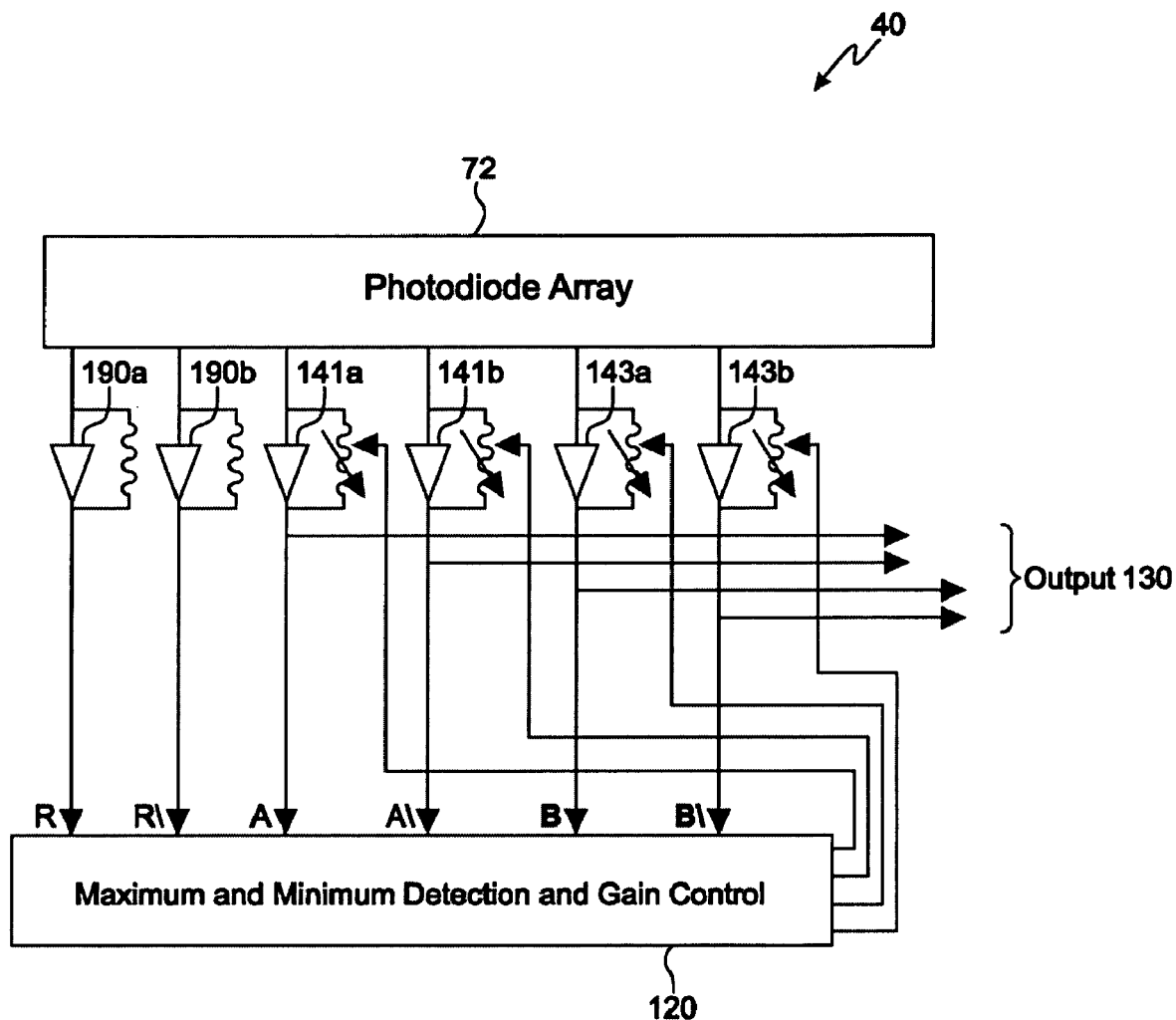
FIG. 8 shows one embodiment of light detector 40 and associated circuitry of the invention.

FIG. 8 illustrates another embodiment of light detector 40 comprising photodiode array 72, which comprises photodetectors 90a, 90b, 41a, 41b, 43a and 43b. The outputs from these photodiodes are routed from photodiode array 72 to amplitude detection and gain control circuitry 120 through transimpedance amplifiers ("TIAs") 190a, 190b, 141a, 141b, 143a and 143b, and thence to output 130. In a preferred embodiment, circuitry 120 includes a gain control section for a the TIAs. The outputs from the TIAs are fed into circuit 120, which is configured to compare the amplitudes of motion detection output signals A and B to reference signal R. On the basis of the comparison, the gain of the TIA is appropriately lowered or increased by circuit 120. Such functionality is repeated in respect of the R\ signal and motion detection output signals A\ and B\. Circuit block 120 also preferably includes circuitry to effect the cross-point detection illustrated in FIG. 5 and to permit the gain control portion of such circuitry to act as a feedback loop for the TIA.

Figure 9:
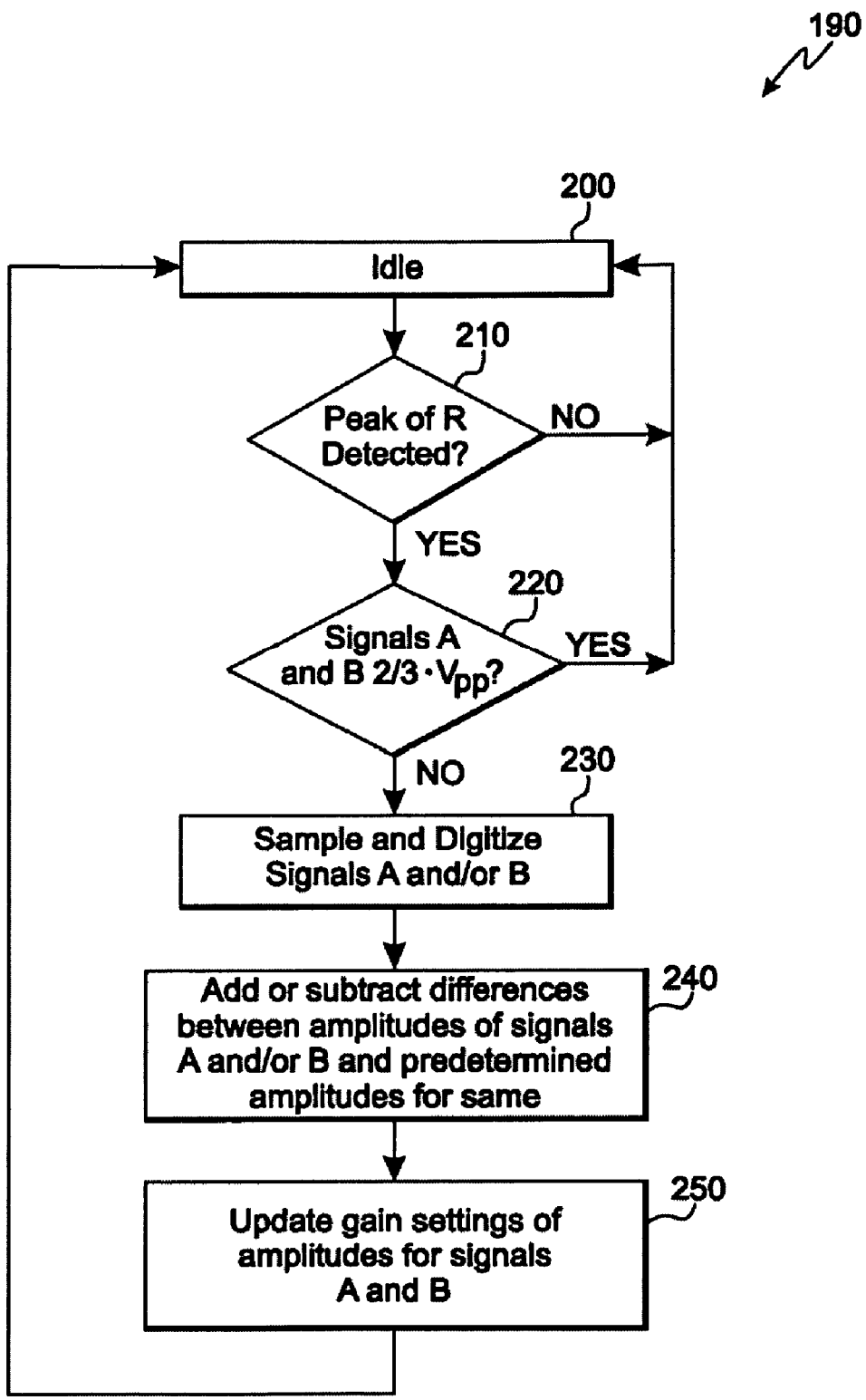
FIG. 9 shows one embodiment of a method for correcting the amplitudes of motion detection photodetectors.

FIG. 9 shows one embodiment of method 190 for correcting the amplitudes of motion detection photodetectors A and B. Method 190 comprises steps 200 through 250, which are detecting the peak of signal R at 210, measuring the respective amplitudes of signals A and B at 220, sampling and digitizing signals A and B at step 230, adding or subtracting at step 240, as required, any differences between predetermined amplitudes for signals A and B, and the amplitudes of signals A and B measured at step 220, and updating the gain settings for the channels corresponding to signals A and B. Those skilled in the art will understand that many different combinations, permutations and variations of the method illustrated in FIG. 9 are possible, and that the method described and shown herein is but one embodiment of such a method.

Continuing to refer to FIG. 9, the basic objective of the method shown therein is to correct the amplitudes of signals A and B by using the peak or maximum amplitude 105 of signal R as a basis for time comparison. When the peak or maximum amplitude 105 of signal R is detected, signals A and B are sampled and the amplitudes corresponding thereto are determined. The measured amplitudes of signals A and B are then compared to predetermined amplitudes, and any respective differences between them determined. In one embodiment, and by way of example, if signal R is 45 degrees out of phase with respect to signals A and B, then such predetermined amplitudes are equal to $\frac{2}{3} V_{pp}$. If signal R is generated using a different phase shift, then different values for the predetermined amplitudes corresponding to signals A and B are employed. If the differences so obtained are greater or less than the predetermined amplitudes corresponding thereto, then the differences corresponding to signals A and/or B are sampled and digitized at step 230. These values, or values proportional to such values, are then added to or subtracted from the original gain settings of the amplifiers corresponding to the channels for signals A and B thereby to update such amplifier gain settings such that signal A and/or B has an amplitude equal to $\frac{2}{3} V_{pp}$ when signal R is measured at its peak. In one embodiment, such updated gain settings are implemented in simple controllable gain transimpedance amplifiers for signals A and B.

The same method illustrated in FIG. 9 is also employed to correct the amplitudes of signals A and B using the valley or minimum amplitude 107 of signal R. In the case of signal R minimum amplitude 107 or valley detection, the amplitudes of signals A and B are compared to predetermined amplitudes equal to $\frac{1}{3} \cdot V_{pp}$. Likewise, the method illustrated in FIG. 9 is employed to correct the amplitudes of signals A\ and B\ by using the peak and valley detection for signal R\.

It will now become apparent to those skilled in the art that the various embodiments of the invention disclosed herein provide several advantages, including, but not limited to providing optical encoders having increased accuracy and amplitude correction.

Note that the terms "vertical" and "horizontal" employed herein are intended to refer to the relative orientations of light detector 40 and the various photodiodes arranged thereon as they relate spatially to one another and to encoder wheel 60 and light emitter 20. Note further that various types of photodetectors known in the art may be employed in the invention, in addition to photodiodes. The various embodiments of the invention described herein may also be adapted for use in reflective encoders.

Note further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. An optical encoder, comprising:
   a light emitter element configured to emit a collimated beam of light;
   an optical encoder disk having a plurality of apertures disposed therethrough and configured to rotate substantially in a plane and in a first direction, and
   a light detector comprising at least first and second photodetectors positioned along the first direction on a first vertical portion thereof and at least one reference photodetector positioned on a second vertical portion thereof, the second vertical portion being vertically offset from the first vertical portion;
   wherein the light detector faces the light emitter, the optical encoder disk is disposed and configured to rotate between the light emitter and the light detector such that the collimated light beam is directed substantially in the plane and shines through the apertures onto the first and second vertical portions of the light detector as the disk rotates, the first and second photodetectors are configured to generate, in response to the collimated beam being incident thereon, first and second output signals about 90 degrees out of phase respecting one another, and the reference photodetector is configured to generate, in response to the collimated beam being incident thereon, a third output signal about 45 degrees out of phase respecting the first output signal and the second output signal, the optical encoder further comprising a circuit configured to receive the third output signal and employ the third output signal to correct at least one of a first amplitude corresponding to the first output signal and a second amplitude corresponding to the second output signal.

2. The optical encoder of claim 1, further comprising a circuit configured to receive the third output signal and match the first amplitude to the second amplitude using the third output signal.

3. The optical encoder of claim 1, further comprising a circuit configured to detect a peak amplitude of the third output signal and compare the peak amplitude to amplitudes of the first and second output signals occurring at the same time as the detected peak amplitude.

4. The optical encoder of claim 1, further comprising a circuit configured to detect a minimum amplitude of the third output signal and compare the minimum amplitude to amplitudes of the first and second output signals occurring at the same time as the detected minimum amplitude.

5. The optical encoder of claim 1, further comprising at least a second reference photodetector positioned on the second vertical portion.

6. The optical encoder of claim 1, wherein the reference photodetector is positioned vertically above or beneath and between the first and second photodetectors.

7. The optical encoder of claim 1, further comprising an amplifier circuit configured to receive the first, second and third output signals.

8. The optical encoder of claim 1, further comprising a peak and minimum amplitude detection circuit configured to receive the first, second and third output signals.

9. The optical encoder of claim 3, wherein the circuit is further configured to adjust at least one of the first and second amplitudes on the basis of the detected peak amplitude.

10. The optical encoder of claim 9, wherein the circuit is further configured to adjust at least one of the first and second amplitudes to about $\frac{2}{3}$ of the detected peak amplitude.

11. The optical encoder of claim 4, wherein the circuit is further configured to adjust at least one of the first and second amplitudes on the basis of the detected minimum amplitude.

12. The optical encoder of claim 11, wherein the circuit is further configured to adjust at least one of the first and second amplitudes to about $\frac{1}{3}$ of the detected peak amplitude.

13. A method of correcting amplitudes of at least first and second output signals provided by an optical encoder, comprising:
   providing a light emitter configured to emit a collimated beam of light;
   providing an optical encoder disk having a plurality of apertures disposed therethrough and configured to rotate substantially in a plane and in a first direction;
   providing a light detector comprising at least first and second photodetectors positioned along the first direction on a first vertical portion thereof and at least one reference photodetector positioned on a second vertical portion thereof, the second vertical portion being vertically offset from the first vertical portion;

positioning the light detector to face the light emitter;

disposing the optical encoder disk between the light emitter and the light detector such that the collimated light beam is directed substantially in the plane and shines through the apertures onto the first and second vertical portions of the light detector as the disk rotates;

generating with the first and second photodetectors, in response to the collimated beam being incident thereon, first and second output signals about 90 degrees out of phase respecting one another;

generating with the reference photodetector, in response to the collimated beam being incident thereon, a third output signal about 45 degrees out of phase respecting the first output signal and the second output signal;

correcting, on the basis of the third output signal, at least one of a first amplitude corresponding to the first output signal and a second amplitude corresponding to the second output signal.

14. The method of claim 13, further comprising detecting a peak amplitude of the third output signal and comparing the peak amplitude to corresponding amplitudes of the first and second output signals occurring at the same time as the detected peak amplitude.

15. The method of claim 13, further comprising detecting a minimum amplitude of the third output signal and comparing the minimum amplitude to corresponding amplitudes of the first and second output signals occurring at the same time as the detected minimum amplitude.

16. The method of claim 13, further comprising providing at least a second reference photodetector positioned on the second vertical portion.

17. The method of claim 13, further comprising positioning the reference photodetector vertically above or beneath and between the first and second photodetectors.

18. The method of claim 14, further comprising adjusting at least one of the first and second amplitudes on the basis of the detected peak amplitude.

19. The method of claim 14, further comprising adjusting at least one of the first and second amplitudes to about $2/3$ of the detected peak amplitude.

20. The method of claim 15, further comprising adjusting at least one of the first and second amplitudes on the basis of the detected minimum amplitude.

21. The method of claim 15, further comprising adjusting at least one of the first and second amplitudes to about $1/3$ of the detected minimum amplitude.

* * * * *